United States Patent [19]
Okugawa

[11] Patent Number: 5,691,681
[45] Date of Patent: Nov. 25, 1997

[54] METHOD OF PRODUCING A FIELD MAGNET FOR A DC MOTOR AND A FIELD MAGNET FOR A DC MOTOR

[75] Inventor: Shougo Okugawa, Mie-ken, Japan

[73] Assignee: Nakagawaseimitsukogyo Kabushikikaisha, Japan

[21] Appl. No.: 552,660

[22] Filed: Nov. 3, 1995

[30] Foreign Application Priority Data

Jan. 13, 1995 [JP] Japan .................................. 7-021238

[51] Int. Cl.⁶ .................................................. H01F 7/20
[52] U.S. Cl. ............................ 335/284; 310/42; 310/152
[58] Field of Search ........................ 335/284; 310/42–45, 310/152–156

[56] References Cited

U.S. PATENT DOCUMENTS 5,502,424  3/1996  Kato et al. ........................ 335/284

FOREIGN PATENT DOCUMENTS 54-116610  9/1979  Japan .
57-142165  9/1982  Japan .
61-85045   4/1986  Japan .
486624     7/1994  Japan .

Primary Examiner—Lincoln Donovan
Attorney, Agent, or Firm—William A. Drucker

[57] ABSTRACT

A method of producing a field magnet for a DC motor is disclosed. A molding material is casted into a molding space which is between outer and inner molds. Field poles are formed by magnetizing poles on the outer peripheral surface of the inner mold, in portions which oppose the magnetizing poles. A magnetic path which connects the field poles with each other is formed in a thickness portion of the molding material by powder of a ferromagnetic material in the molding material.

2 Claims, 5 Drawing Sheets

METHOD OF PRODUCING A FIELD MAGNET FOR A DC MOTOR AND A FIELD MAGNET FOR A DC MOTOR

TECHNICAL FIELD

The invention relates to a method of producing a field magnet which is useful in a DC motor.

BACKGROUND ART

A field magnet is formed by adhering a plurality of permanent magnets for respectively forming magnetic poles, to the inner peripheral surface of a cylindrical yoke for forming a magnetic path. When a thus formed field magnet is used in a DC motor, it is possible to apply intense magnetic fluxes from the magnetic poles to an armature. Therefore, this produces an advantage that a large torque can be generated. When such a field magnet is to be produced, it is possible to use materials respectively dedicated for the magnetic path and the magnetic pole, thereby producing another advantage that a field magnet of excellent properties can be produced by a reduced material cost.

In the production of such a field magnet, however, it is required to conduct operations of positioning the plurality of permanent magnets with respect to the yoke, and adhering the magnets to the yoke under the positioned state. The operations are cumbersome, and hence there arises a problem in that the labor cost is increased in accountry where personal expenses are higher. In the adhering process, when an excess amount of an adhesive agent is used, the adhesive agent hangs down from the inner peripheral surfaces of the magnetic poles. The hanging adhesive agent is solidified to form projections on the inner peripheral surfaces of the magnetic poles. The projections impair the rotation of the armature, with the result the field magnet becomes a defective product. In contrast, when the amount of the adhesive agent is too small, a reduced adhesive strength is exerted. When vibrations are applied to a motor during its use, therefore, the danger that the permanent magnets slip off from the cylindrical yoke is increased. This requires the selection of the amount of the adhesive agent to be determined with extra care. Also in this view point, there is a problem in that the labor cost is increased.

SUMMARY OF THE INVENTION

The method of producing a field magnet for a DC motor according to the invention is provided in order to solve the above-discussed problems (technical problems) of the prior art.

It is a first object of the invention to realize the production of a field magnet which can apply intense magnetic fluxes to an armature so that a large torque is generated.

It is a second object of the invention to realize the production of a field magnet which is tough and can be used for a long period.

It is a third object of the invention to provide a production method in which such a field magnet can be produced with reduced labors and the labor cost can be suppressed to a low level.

The method of producing a field magnet for a DC motor of the present invention comprises the steps of:

placing an inner mold having a plurality of magnetizing poles on an outer peripheral surface inside an outer mold made of a nonmagnetic material, thereby forming a cylindrical molding space between said inner and outer molds; and casting a molding material into said molding space, said molding material being a mixture of powder of a ferromagnetic material for forming a field magnet and a binder for binding said powder, forming field poles by said magnetizing poles in portions of said casted molding material which respectively oppose said magnetizing poles, and forming a magnetic path by said powder of the ferromagnetic material of said molding material in a thickness portion of said molding material, said magnetic path connecting said field poles with each other.

According to the invention, it is possible to produce a cylindrical field magnet which has a plurality of field poles on an inner peripheral surface, and a magnetic path connecting the field poles with each other in a thickness portion. When the produced field magnet is used in a DC motor, the field poles can apply intense magnetic fluxes to an armature. As a result, an effect that a large rotation torque is generated is attained.

In the field magnet which is formed in accordance with the invention, the field poles and a magnetic path are integrally connected with each other through one material. When the field magnet is used in the DC motor, even if vibrations are applied to the DC motor during its use, there is a smaller possibility that damages such as that a part of the field magnet slips off are caused. Consequently, the field magnet has an advantage that, even when it is used for a long period, it is free from a fault and has high reliability.

According to the invention, although the field magnet which is very useful can be formed, the field magnet can be produced by only casting a molding material into a molding tool. When the casting is done, the field poles are formed by magnetizing poles of the molding tool, and the magnetic path connecting the field poles with each other in a thickness portion of the molding material is formed by a ferromagnetic powder in the molding material. Therefore, the amount of the labor which is to be performed by the worker is reduced to a very small level, and hence the invention has an advantage that the labor cost can be reduced remarkably.

Other objects and advantages of the invention will become apparent during the following discussion of the accompanying drawings.

DESCRIPTION OF THE PREFERRED EMBODIMENT

Figure 1:
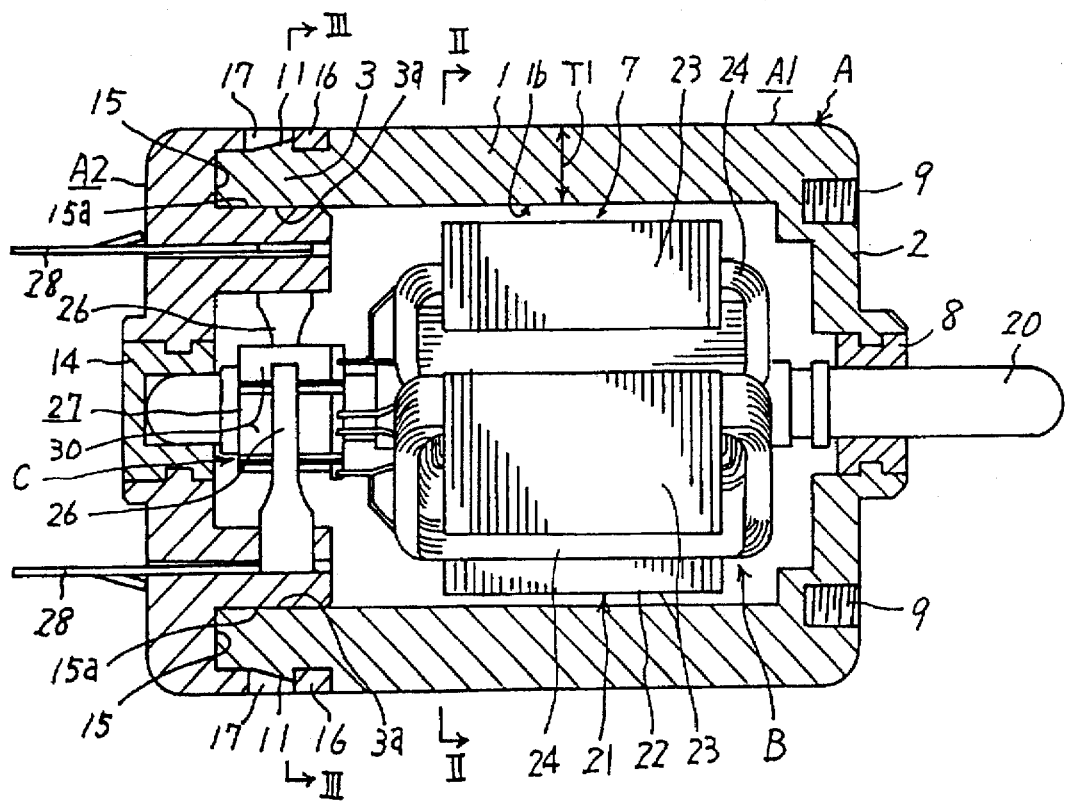
FIG. 1 is a longitudinal section view of a DC motor.
Figure 2:
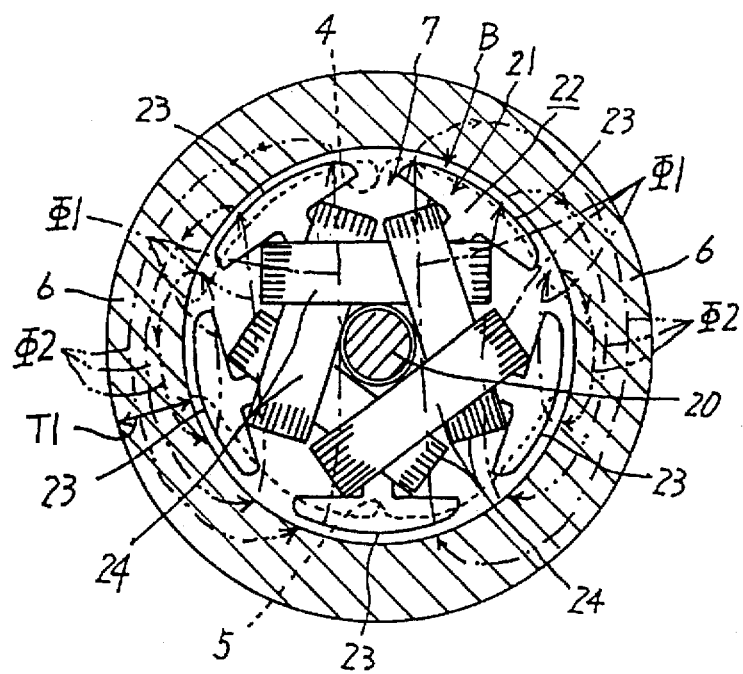
FIG. 2 is a section view taken along line II—II in FIG. 1.
Figure 3:
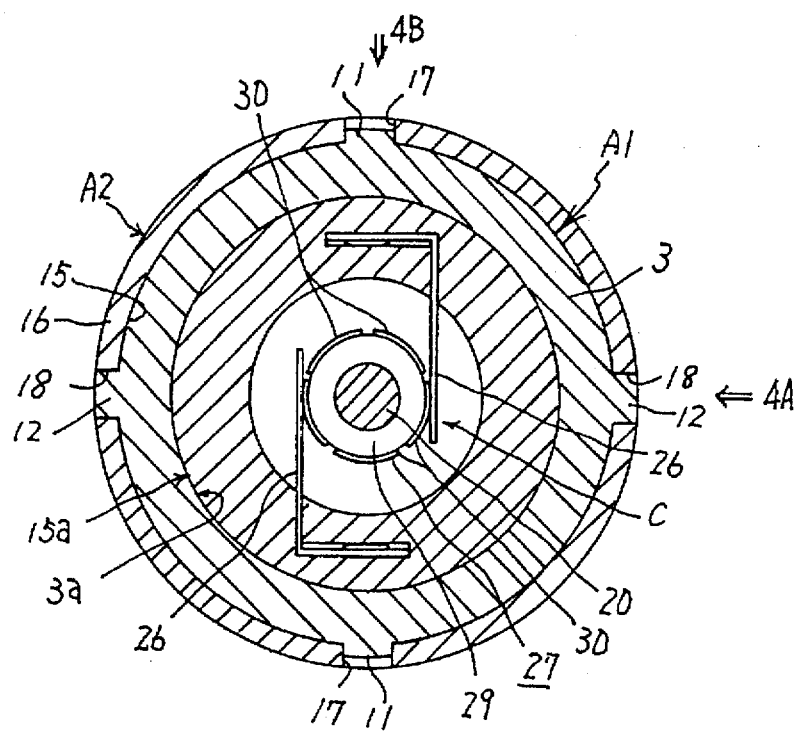
FIG. 3 is a section view taken along line III—III in FIG. 1.
Figure 4A:
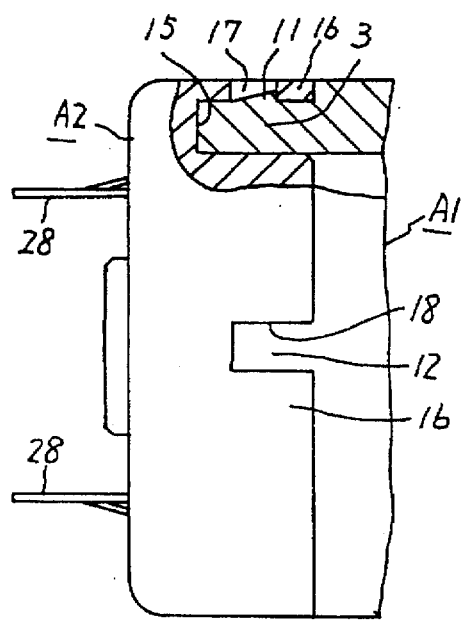
FIG. 4A is a partially cutaway fragmentary view as seen in the direction 4A in FIG. 3.
Figure 4B:
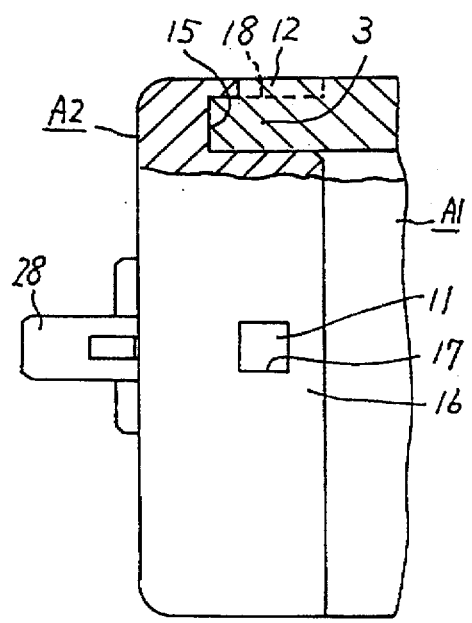
FIG. 4B is a partially cutaway fragmentary view as seen in the direction 4B in FIG. 3.

Hereinafter, drawings showing embodiments of the invention will be described. FIGS. 1 to 4 show an example of a DC motor which is used as a washer pump motor of an automobile. The DC motor comprises a stator A, a rotor B which is rotated with respect to the stator, and a power supplying mechanism C through which an electric power is supplied from the stator to the rotor. First, the stator A will be described. The stator A supports the rotor, applies magnetic fluxes to the rotor, and functions also as a case which houses the rotor and the power supplying mechanism. In order to enable the stator A to be assembled while the rotor and the power supplying mechanism are housed therein, the stator A is configured by the body A1 having a recessed shape, and a cover A2 which is fitted to an opening of the body so as to close the opening. The body A1 comprises a field magnet 1 of a cylindrical, for example, circular cylindrical shape, a bearing 2 which is disposed at an end of the magnet, and a fitting portion 3 which is disposed at the other end and onto which the cover A2 is to be fitted. The field magnet 1 applies magnetic fluxes to an armature in the rotor. The field magnet 1 comprises plural, for example, two field poles 4 and 5 on the inner peripheral surface 1b. The field poles 4 and 5 supply magnetic fluxes Φ 1 (in the figure, the fluxes are diagrammatically shown) into an armature accommodating space 7 inside the field magnet 1. One of the field poles 4 and 5, for example, the field pole 5 is an N-pole for emitting the magnetic fluxes Φ 1, and the other pole, for example, the field pole 4 is an S-pole for receiving the magnetic fluxes Φ 1. In order to improve the rotation torque of the rotor which is generated by the magnetic fluxes Φ 1, both the field poles 4 and 5 emit (or receive) fluxes in a substantially uniform density over the approximately whole area. The substantially uniform magnetic fluxes mean that the deviation between high and low levels is less than about 50%. The thickness portion T1 of the field magnet 1 serves as a magnetic path 6 for passing (intermediating) magnetic fluxes Φ 2 (in the figure, the fluxes are diagrammatically shown) between the field poles 4 and 5 with a reduced magnetic resistance. In the view point of the function as the case of the body A1, the field magnet 1 serves as a circumferential wall of the case. The bearing 2 is a part for supporting a rotation shaft 20 of the rotor B. The bearing 2 comprises a bearing member 8 so as to increase the abrasion resistance to the rotation shaft 20. In order to prevent the rotation shaft 20 from being magnetically attracted, the bearing member 8 is made of a nonmagnetic material such as brass. Threaded holes 9 are formed in the bearing 2, as an example of a mounting portion for mounting the motor to apparatuses of various kinds. In the view point of the function as the case of the body A1, the bearing 2 serves as a bottom wall. The fitting portion 3 is formed into an annular shape, and comprises an engaging claw 11 and an fitting piece 12 on the outer peripheral surface. The engaging claw 11 is used for connecting the cover A2 with the body A1. The fitting piece 12 is used for positioning the cover A2 with respect to the body A1 in the rotation direction.

The thus configured body A1 is formed by molding a molding material which is a mixture of powder of a ferromagnetic material and a binder, with using molds. The ferromagnetic material powder is used for forming the field poles 4 and 5 and the magnetic path 6, and the binder for binding the powder. The molding is conducted while applying a magnetic force for forming the field poles 4 and 5. The body is produced in this manner in order to facilitate the production, also to provide the field magnet 1 with the field poles 4 and 5 and the magnetic path 6. In order to attain the magnetic force required for the field poles 4 and 5 and the permeability required for the magnetic path 6, as the ferromagnetic material powder, ferrite magnetic powder, alnico magnetic powder, samarium-cobalt magnetic powder, rare earth magnetic powder such as neodymium-iron-boron magnet, or the like is selected in accordance with the required magnetic force and permeability. In order to attain the mechanical force required for the body A1 as the case, a synthetic resin such as nylon-6, nylon-12, nylon-66, polyvinyl chloride, polyethylene, polypropylene, polycarbonate, PBT, PET, ABS, or AS resin is selected as the binder in accordance with the required mechanical strength. The ratio of the powder and the binder is suitably selected in accordance with the required magnetic force and mechanical strength. For example, the former is 80 to 95 wt. %, and the latter is 20 to 5 wt. %. The outer diameter of the body A1 is selected to be a value suitable for the size required for the motor. The dimensions of the thickness portion T1 of the field magnet 1 are determined in accordance with the magnetic force required for the field poles 4 and 5. In the embodiment, for example, the outer diameter is 30 mm and the thickness T1 is 4 mm. In this case, the magnetic force of the field poles 4 and 5 is about 1,200 gausses. In the outer peripheral surface of the body A1 formed by molding the above-mentioned material, the binder performs the function of rust prevention. Therefore, it is not required to additionally apply a rust preventative agent onto the outer peripheral surface of the molded body. Although varying depending on the kind of the molding material to be used, the specific gravity of the body A1 having the above-mentioned structure is about 3.4 to 6.0. When ferrite magnetic powder is used as the ferromagnetic material powder, particularly, the specific gravity is about 3.5, and hence the body can be lightened.

The cover A2 serves also as another bearing which corresponds to the bearing 2, and is provided at its center with a bearing member 14 with the same objective as that of the bearing member 8. The reference numeral 15 designates a fitting groove into which the fitting portion 3 is to be fitted and which is formed into an annular shape so as to correspond to the fitting portion 3. The diameter of the inner peripheral wall surface 15a has a value which allows the fitting portion 3 to be closely fitted without forming a gap between the inner peripheral surface 3a of the fitting portion 3 and the surface 15a. The reference numeral 16 designates an outer wall member of the fitting groove 15. An engaging hole 17 with which the engaging claw 11 is to be engaged, and a fitting recess 18 into which the fitting piece 12 is to be fitted are formed at the positions corresponding to the claw 11 and the piece 12, respectively. In order to support brushes (described later) for the power supplying mechanism C in an electrically insulated manner, the cover A2 having such a configuration is formed by molding an insulating material such as that exemplified as the binder.

The rotor B has the configuration which is well known in the field of a DC motor, and is configured by components designated by the reference numerals 20 to 24. Namely, 20 designates the rotation shaft, and 21 designates the armature. The reference numeral 22 designates a core of the armature 21 which is attached to the rotation shaft 20, 23 designates magnetic poles of the core 22, and 24 designates windings of the armature. In the embodiment, the number of the magnetic poles 23 of the armature 21 is set to be 5 . Alternatively, the number may be set to be various values, such as 3, or 7.

The power supplying mechanism C has the configuration which is well known in the field of a DC motor, and is configured by the commutator brushes 26, and a commutator 27 attached to the rotation shaft 20. The reference numeral 28 designates input terminals through which an electric power is supplied and which is integrated with the brushes 26. The commutator 27 comprises a commutator sleeve 29 made of an insulating material, and commutator segments 30 the number of which corresponds to that of the magnetic poles 23. The ends of each armature winding 24 are connected to the corresponding commutator segment 30 in the manner which is usually known in the field of a DC motor.

Next, the operation of the DC motor will be described. The field poles 4 and 5 of the field magnet 1 supply magnetic fluxes Φ 1 into the armature accommodating space 7. When a DC current is supplied through the pair of terminals 28, the DC current flows through the commutator brushes 26 and the commutator segments 30 contacting with the brushes, into the corresponding armature winding 24, and the magnetic poles 23 of the armature 21 produces magnetic fluxes crossing the magnetic fluxes Φ 1. As a result, a rotation torque is generated in the armature 21, and the rotor B is rotated. In this case, as well known in the field, the power supply to the plural armature winding 24 is switched by the commutator 27 as the rotor B is rotated, and hence the rotation torque which is always directed in the same direction is generated in the armature 21 so that the rotor B is continued to be rotated.

When such an operation is done, in the field magnet 1, the transmission of the magnetic fluxes Φ 2 between the field poles 4 and 5 is conducted through the magnetic path 6 with a reduced magnetic resistance. Consequently, the magnetic poles 4 and 5 can apply intense magnetic fluxes Φ 1 into the space 7 so that a large torque can be generated in the armature 21.

Figure 5:
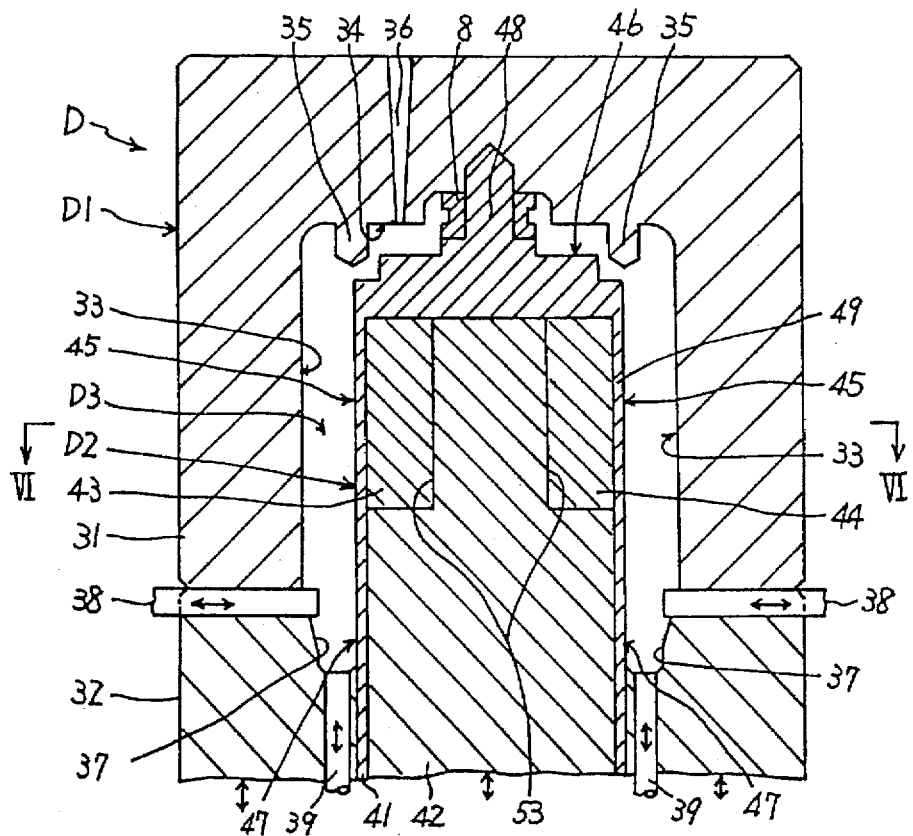
FIG. 5 is a longitudinal section view showing a molding tool for the body of a stator.
Figure 6:
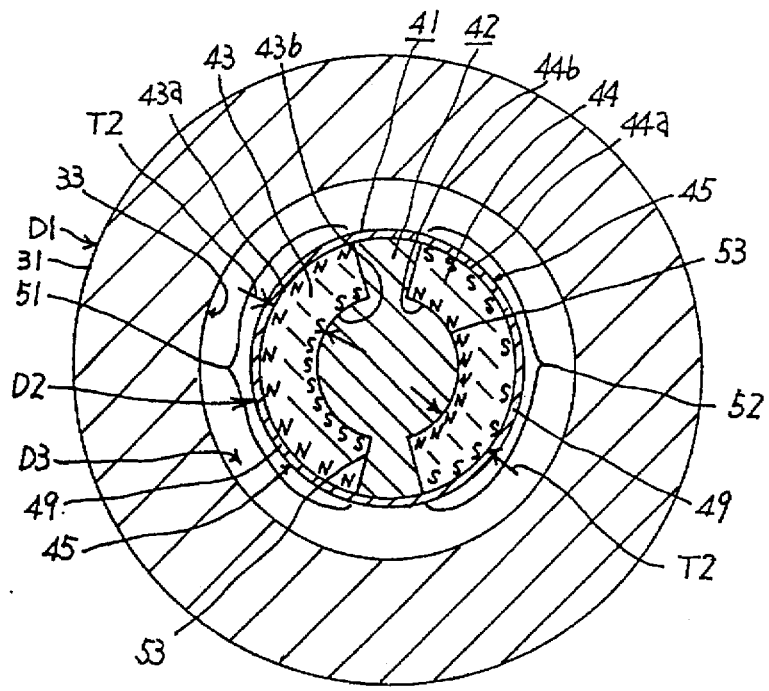
FIG. 6 section view taken along line VI—VI in FIG. 5.

Hereinafter, FIGS. 5 and 6 showing a molding tool which is used for producing the body A1 will be explained. The molding tool D comprises an outer mold D1 for forming the outer peripheral surface of the body A1, and an inner mold D2 for molding the inner peripheral surface. A molding space D3 for molding the body A1 is formed between said outer and inner molds D1 and D2. In order to enable the molded body A1 from being removed from the molding tool, the outer mold D1 is configured by first and second elements 31 and 32 which can be separated from each other. The first element 31 is, for example, a fixed upper mold which, in the embodiment, is used for molding the field magnet 1 and the bearing 2. The first element 31 is made of a nonmagnetic material such as nonmagnetic super hard steel N-7 so that, in the molding of the body A1, a substantially whole amount of magnetic fluxes caused by magnetizing poles which will be described later are passed through the thickness portion of the field magnet 1 under the molding process or the magnetic fluxes are prevented from leaking to the outside. Alternatively, the element may be made of another material such as nonmagnetic stainless steel, beryllium copper alloy, high manganese steel, bronze, brass, or copper. In the first element 31, 33 designates a molding surface for the outer peripheral surface of the field magnet 1, 34 designates a molding surface for the outer surface of the bearing 2, 35 designates projections for forming the preliminary holes of the mounting portion 9, and 36 designates a gate port for casting the molding material into the molding space D3. The second element 32 is, for example, a movable lower mold which, in the embodiment, is used for molding the fitting portion 3. The second element 32 is made of a nonmagnetic material with the same objective as that of the first element 31. The reference numeral 37 designates a molding surface for the outer peripheral surface of the fitting portion 3, in the second element 32. The reference numeral 38 designates a core for forming the engaging claw 11. The core is disposed so as to freely advance or retreat in the directions of the arrows with respect to the second element 32. The reference numeral 39 designates ejector pins for removing the molded body A1 from the molding tool. The ejector pins are made of a nonmagnetic material.

The inner mold D2 is configured by a first element 41 in the outer side and a second element 42 in the inner side so as to incorporate magnetizing magnets. Magnetizing magnets 43 and 44 are disposed between the elements 41 and 42. The first and second elements 41 and 42 are made of a nonmagnetic material so as not to block the magnetic fluxes of the magnetizing magnets 43 and 44. The reference numerals 45 to 47 designate outer peripheral molding surfaces of the first element 41, in which, 45 is the molding surface for the inner peripheral surface of the field magnet 1, 46 is that for the inner surface of the bearing 2, and 47 is that for the inner peripheral surface of the fitting portion 3. The reference numeral 48 designates a holding portion of the bearing member 8. The reference numeral 49 designates a protection wall in the first element 41 which is a part for preventing the magnetizing magnets 43 and 44 from slipping off, and also the magnets 43 and 44 from being damaged in the molding process of the body A1. The protection wall 49 blocks the pressure of the molding material casted into the molding space D3 from being directly applied to the magnets 43 and 44, thereby preventing the magnets 43 and 44 from being damaged. Preferably, faces 43a and 44a on the side of the outer periphery of the magnets 43 and 44 are located at positions as close as possible to the molding surface 45 so that the magnetic fluxes from the faces 43a and 44a are effectively applied to the molding surface 45. In order to attain the above, the protection wall 49 may be formed so as to be as thin as possible (for example, about 0.5 to 1 mm) in the range where the strength required for the above-mentioned protection is obtained. The reference numerals 51 and 52 indicate that magnetizing poles for forming the field poles 4 and 5 of the field magnet 1 exist in the molding surface 45 of the inner mold D2. As illustrated, since the faces 43a and 44a on the side of the outer periphery of the magnetizing magnets 43 and 44 are located inside the protection wall 49, the portions of the molding surface 45 which are positioned on the outer periphery side of the faces 43a and 44a serve as the magnetizing poles 51 and 52. The reference numeral 53 designates holding portions which are formed in the second element 42 and used for holding the magnetizing magnets 43 and 44. The holding portions 53 are formed so that the magnetizing magnets 43 and 44 are closely fitted onto the portions without rattling.

In order to magnetize the whole area of each of the field poles 4 and 5 in a uniform magnetic flux density, the magnetizing magnets 43 and 44 have an arcuate shape as shown in the figure, and the faces 43a and 44a on the side of the outer periphery and faces 43b and 44b on the side of the inner periphery constitute magnetic poles of a uniform magnetic flux density on the whole area of the respective faces. The magnetizing magnets 43 and 44 are rare-earth magnets, ferrite magnets, alnico magnets, or the like so that the field poles 4 and 5 are intensely magnetized by a magnet of small size. For example, the magnetic flux density in the faces 43a and 44a is about 5,000 gausses. The magnets 43 and 44 have a thickness T2 which allows a necessary magnetic flux density to be obtained.

Figure 7A:
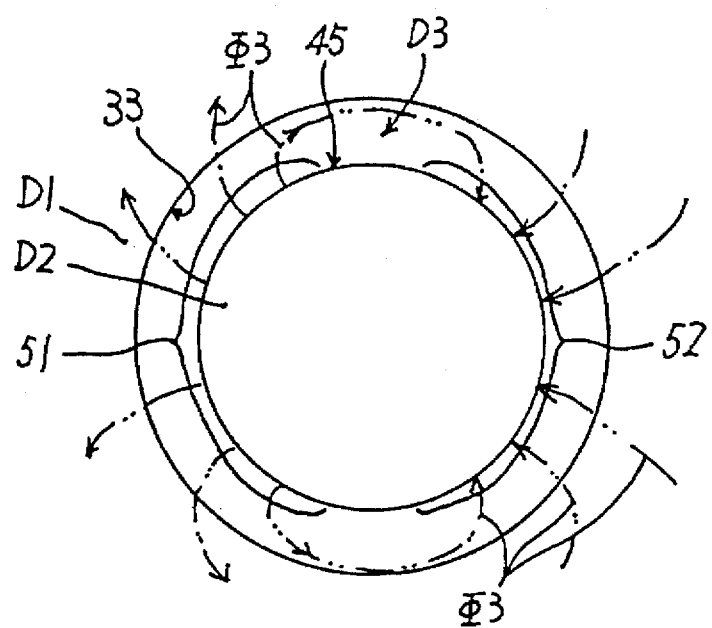
FIG. 7A is a diagram showing the sate of magnetic fluxes in the molding tool before a molding material is casted.
Figure 7B:
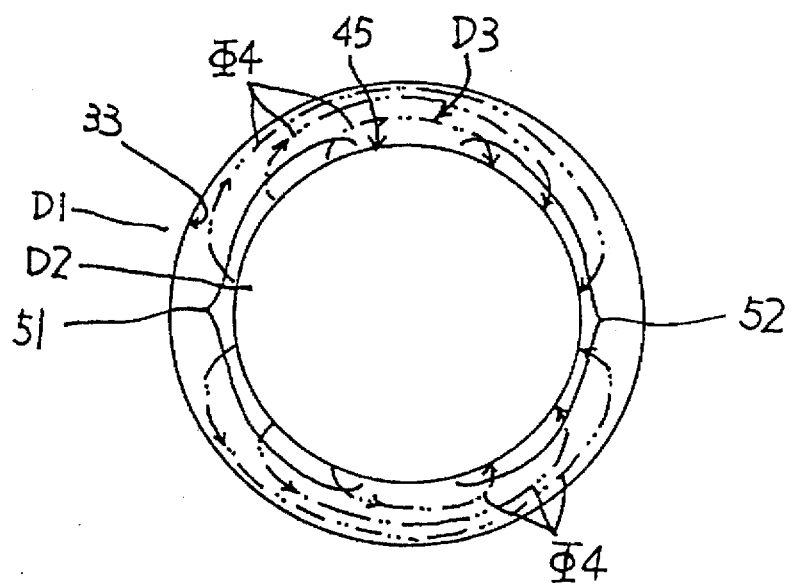
FIG. 7B is a diagram showing magnetic fluxes after the molding material is casted.

Next, the production of the body A1 will be described. The molding tool D is assembled as shown in FIG. 5. In this state, there is no element for blocking or guiding magnetic fluxes of the magnetizing poles 51 and 52, and hence the magnetic fluxes are distributed as diagrammatically indicated by the symbol Φ 3 in FIG. 7A. The molding material is casted into the molding space D3 in the state where the molding tool D is assembled. Specifically, the powder of the ferromagnetic material and the binder are mixed sufficiently uniformly, thereby preparing the molding material. In the state where the binder is fused by, for example, heating, the molding material is casted (in the embodiment, injected) by an injection molding machine into the molding space D3 via the gate port 36 so as to be packed in the space. After the packing process is done, the ferromagnetic material powder of the molding material packed in the molding space D3 functions as the magnetic path in the space. The magnetic path guides the magnetic fluxes from the magnetizing poles 51 and 52 as indicated by the symbol h4 in FIG. 7B. Consequently, most of the magnetic fluxes from the magnetizing poles 51 and 52 pass through the packed molding material. This causes the axes of easy magnetization of particles constituting the ferromagnetic material powder to be oriented in the direction of the magnetic fluxes h4. When a predetermined solidification period has been elapsed in this state, the binder in the molding material is solidified. The solidification of the binder causes particles of the ferromagnetic material powder to be fixed while their axes of easy magnetization are oriented in the direction of the magnetic fluxes h4. When the binder is solidified and the molding of the body A1 is completed, the second element 32 of the outer mold D1, and the inner mold D2 are integrally lowered, and the body A1 is extracted from the first element 31 of the outer mold D1. Then, the core 38 is retracted, and the body A1 is pushed upward by the ejector pins 39 so as to remove the body A1 from the inner mold D2. In the removed body A1, particles of the ferromagnetic material in the thickness portion are fixed in the orientation state described above. Accordingly, the particles constitute the magnetic path 6 so as to transmit the magnetic fluxes between the field poles 4 and 5. As described above, therefore, it is possible to apply very intense magnetic fluxes from the field poles 4 and 5 to the space 7. After the body A1 is molded in the manner described above, the preliminary holes formed by the projections 35 is threaded, and the formation of the body A1 is completed.

The DC motor is assembled in the following manner. First, the brushes 26 are attached to the cover A2 which is molded in another process. The rotor B is produced in a further process. Then, one end of the rotation shaft 20 is inserted into the bearing member 14 while placing the commutator 27 of the rotor B between the pair of the brushes 26. The body A1 is then placed over the rotor B in such a manner that the rotation shaft 20 is passed through the bearing member 8. The fitting portion 3 is fitted into the fitting groove 15, the fitting piece 12 is fitted into the fitting recess 18, and the engaging claw 11 is engaged with the engaging hole 17, thereby completing the motor. In the process of attaching the body A1, the fitting of the fitting piece 12 into the fitting recess 18, and the engagement of the engaging claw 11 with the engaging hole 17 causes the brushes 26 and the field poles 4 and 5 to have predetermined positional relationships. For example, the direction of a line connecting the field poles 4 and 5 (the vertical directions in FIG. 2), and that in which the brushes 26 oppose to each other (the horizontal directions in FIG. 3) establish the mutual relationship of 90°.

Figure 8A:
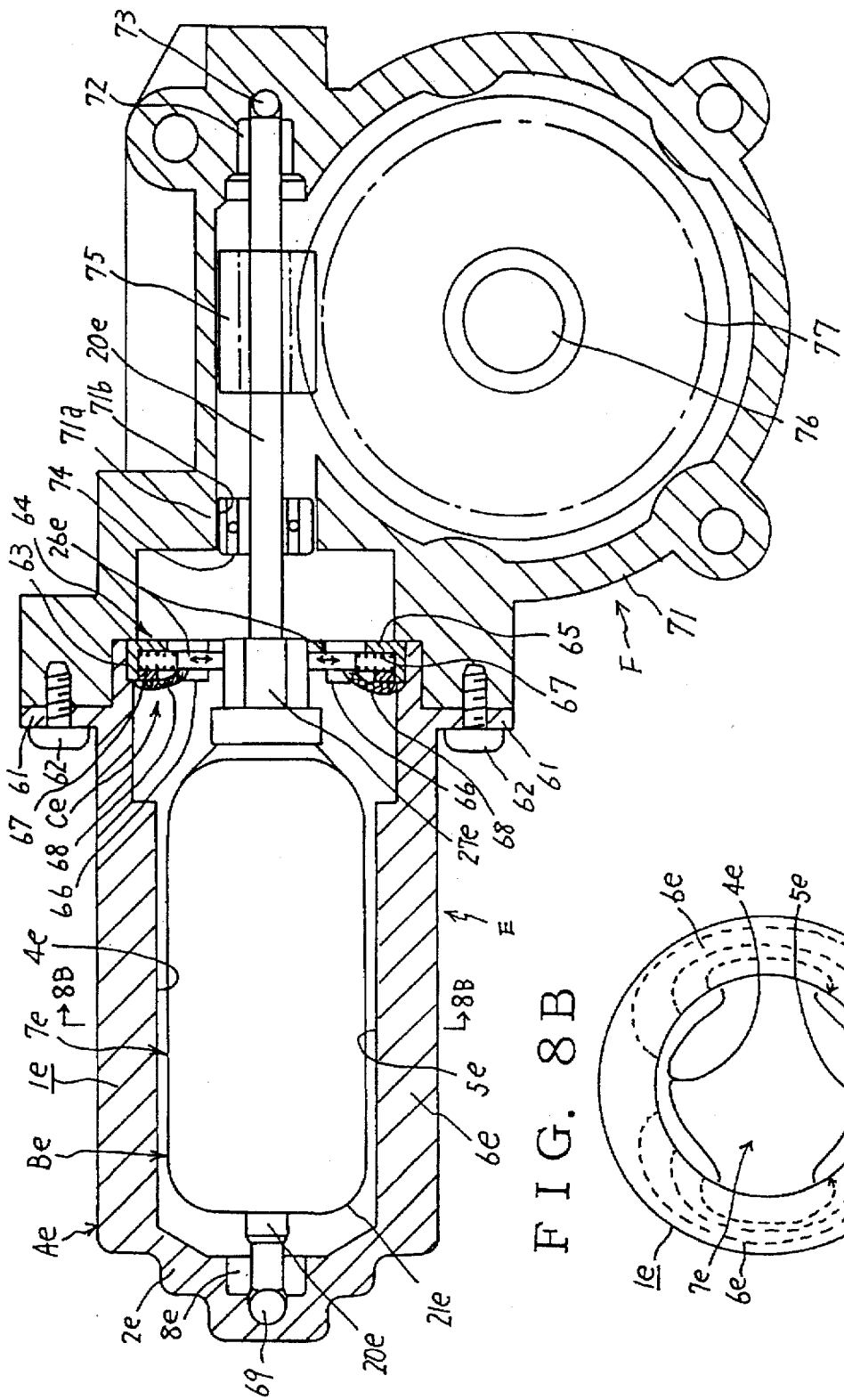
FIG. 8A is a longitudinal section view showing another embodiment.
Figure 8B:
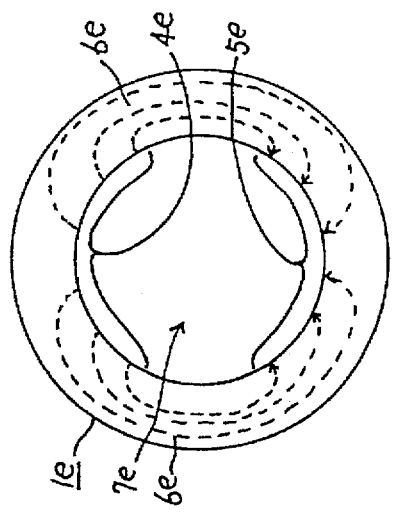
FIG. 8B is a section view which is taken by cutting a field magnet along line 8B—8B of FIG. 8A and shows the sate of magnetic fluxes in the field magnet.

Hereinafter, FIG. 8 showing another example of a DC motor which is a motor for a power window of an automobile will be described. The motor comprises a motor unit E and a reduction gear unit F. Both the units are integrated into one body by securing a mounting piece 61 of the motor unit E to a housing 71 of the reduction gear unit F with a tapping screw 62 which is an example of a securing member. First, the configuration of the motor unit E will be described. The reference numeral 63 designates a mounting portion for a brush unit which is disposed on a stator Ae of the motor unit E, and 64 designates the brush unit attached to the portion. The brush unit 64 comprises a bracket 65 which serves as a base, brush holders 66 attached to the bracket, commutator brushes 26e which are held by the holders 66 so as to freely advance or retreat in the directions of the arrows, springs 67 for urging the commutator brushes 26e toward a commutator 27e, and connecting terminals (not shown) which are attached to the bracket 65. The reference numeral 68 designates flexible wires connecting the brushes 26e with the connecting terminals, and 69 designates a ball which receives the end of a rotation shaft 20e so as to allow the rotation shaft to be smoothly rotated even when a large thrust load is applied to the rotation shaft 20e. Next, the reduction gear unit F will be described. The reference numeral 71 designates a housing, 72 designates a bearing for supporting the rotation shaft 20e, 73 designates a ball which is disposed with the same objective as that of the ball 69, and 74 designates an auxiliary bearing which prevents the rotation shaft 20e from being largely deflected when a large force is radially applied to the rotation shaft 20e. As an example of the auxiliary bearing 74, a ball bearing which is forcedly inserted onto the rotation shaft 20e and fixed thereto is used. The outer peripheral surface of the auxiliary bearing 74 is separated from the inner peripheral surface 71b of a receiving portion 71a of the housing 71 by a small gap (for example, 0.1 to 0.2 mm). When the rotation shaft 20e is disposed to be deflected, the outer peripheral surface of the auxiliary bearing 74 makes contact with the inner peripheral surface 71b, thereby preventing the rotation shaft 20e from being excessively deflected. The reference numeral 75 designates a worm gear fixed to the rotation shaft 20e, 76 designates a driving shaft which is rotatably attached to the housing 71, and 77 designates a worm wheel which is fixed to the driving shaft 76 and meshed with the worm gear 75. The components which are functionally equivalent to those shown in the figures described above and seemed to be duplicated in description are designated by the reference numerals which are the same as those used in the figures and accompanied by letter "e", and their duplicated description is omitted.

As many apparently widely different embodiments of this invention may be made without departing from the spirit and scope thereof, it is to be understood that the invention is not limited to the specific embodiments thereof except as defined in the appended claims.

What is claimed is:

1. A method of fabricating a field magnet for a DC motor, comprising the steps of:
  (a) providing an outer mold of a nonmagnetic material having a hollowed inner portion formed in an annular shape to surround the outer periphery of the molding space for the field magnet;
  (b) providing an inner mold of a nonmagnetic material having an outer peripheral face having an annular shape corresponding to the inner periphery of said outer mold for shaping the inner periphery of said field magnet, said inner mold having plural magnetizing poles disposed on the outer peripheral face thereof;
  (c) said outer and inner molds being arranged so that the cylindrical molding space for the field magnet is formed between the inner face of the outer mold and the outer peripheral face of the inner mold with the magnetic fluxes emitted from the magnetizing poles passing through the outer and inner molds and the molding space therebetween;

(d) providing a mixture of ferromagnetic material and a binder as a molding material and filling said molding space with said molding material, directing magnetic flux between said magnetizing poles using said molding material in said molding space as a part of the magnetic path between said magnetizing poles to orient the axes of easy magnetization of particles of the ferromagnetic material in the direction of the magnetic fluxes with the ferromagnetic material which respectively opposes the magnetizing poles and on the side of the inner peripheral face being magnetized more intensely than the ferromagnetic material in the other portions, thereby configuring field poles; and (e) fixing the axes of easy magnetization of particles of the ferromagnetic material powder by solidifying the molding material while maintaining the axes of easy magnetization to be oriented in the direction of the magnetic fluxes, thereby simultaneously configuring the field poles and the magnetic path interposed between the field poles in the molding material.

2. A field magnet for a DC motor which comprises:

(a) a cylindrically shaped element formed of a molding material which is a mixture of powder of a ferromagnetic material for forming the field magnet and a binder for binding the powder;

(b) plural field poles intensely magnetized and disposed in the ferromagnetic material on the side of the cylindrical inner peripheral face of the field magnet; and (c) plural magnetic paths in said cylindrically shaped powder in which the axes of easy magnetization of particles of the ferromagnetic material are oriented in the direction of a line connecting the plural field poles are formed in the interior of the cylindrical portion of the field magnet.

* * * * *